(12) United States Patent
McCauley (10) Patent No.: US 9,773,240 B1
(45) Date of Patent: Sep. 26, 2017

(54) FAKE SENSOR INPUT FOR PASSCODE ENTRY SECURITY

(71) Applicant: Square, Inc., San Francisco, CA (US)

(72) Inventor: Nathan McCauley, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 986 days.

(21) Appl. No.: 14/026,187

(22) Filed: Sep. 13, 2013

(51) Int. Cl.
| *H04L 9/32* | (2006.01) |
| *G06Q 20/32* | (2012.01) |
| *G06Q 20/34* | (2012.01) |
| *G06Q 20/40* | (2012.01) |

(52) U.S. Cl.
CPC ....... *G06Q 20/3227* (2013.01); *G06Q 20/356* (2013.01); *G06Q 20/4012* (2013.01)

(58) Field of Classification Search
None
See application file for complete search history.

(56) References Cited

U.S. PATENT DOCUMENTS

| 5,815,083 A | 9/1998 | Patarin et al. |
| 5,903,652 A | 5/1999 | Mital |
| 5,949,348 A | 9/1999 | Kapp et al. |
| 5,970,146 A | 10/1999 | McCall et al. |
| 6,257,486 B1 | 7/2001 | Teicher et al. |
| 6,434,702 B1 | 8/2002 | Maddalozzo, Jr. et al. |
| 6,549,194 B1 | 4/2003 | McIntyre et al. |
| 6,925,169 B2 | 8/2005 | Habu |
| 7,058,613 B1 | 6/2006 | Sato et al. |
| 7,096,256 B1 | 8/2006 | Shafer |
| 7,333,602 B2 | 2/2008 | Habu |
| 7,596,701 B2 | 9/2009 | Varghese et al. |
| 7,641,111 B2 | 1/2010 | Adams et al. |
| 7,705,829 B1 | 4/2010 | Plotnikov |
| 8,254,579 B1 | 8/2012 | Morgan et al. |
| 8,281,998 B2 | 10/2012 | Tang et al. |
| 8,392,846 B2 | 3/2013 | Carapelli |

(Continued)

FOREIGN PATENT DOCUMENTS

| CA | 2 919 655 A1 | 2/2015 |
| CA | 2 925 747 A1 | 4/2015 |

(Continued)

OTHER PUBLICATIONS

"A Guide to EMV—Version 1.0 (presentation)," EMVCo, dated May 2011, pp. 1-39.

(Continued)

*Primary Examiner* — John Hayes
*Assistant Examiner* — Jason Fenstermacher
(74) *Attorney, Agent, or Firm* — Mattingly & Malur, PC (57) ABSTRACT

A method of preventing passcode logging is disclosed. The method may include: presenting a passcode entry interface on an electronic device; receiving a sensor input sequence from a sensor of the electronic device, wherein the sensor input sequence is indicative of a user's interaction with the passcode entry interface; and introducing a fake sensor entry into the sensor input sequence on the electronic device, wherein the fake sensor entry is introduced in accordance to a pattern to later distinguish the fake sensor entry from an actual sensor entry in the sensor input sequence.

26 Claims, 7 Drawing Sheets

(56) References Cited

U.S. PATENT DOCUMENTS

| | | | |
|---|---|---|---|
| 8,613,070 B1 | 12/2013 | Borzycki et al. | |
| 8,978,975 B2 | 3/2015 | Barnett | |
| 9,141,977 B2 | 9/2015 | Davis et al. | |
| 9,229,549 B1* | 1/2016 | Lee | G06F 3/041 |
| 2002/0188872 A1 | 12/2002 | Willeby | |
| 2002/0196274 A1 | 12/2002 | Comfort et al. | |
| 2003/0182558 A1 | 9/2003 | Lazzaro et al. | |
| 2004/0096188 A1 | 5/2004 | Kageyama | |
| 2004/0139340 A1 | 7/2004 | Johnson et al. | |
| 2005/0193208 A1 | 9/2005 | Charrette, III et al. | |
| 2005/0195170 A1 | 9/2005 | Habu | |
| 2005/0212763 A1 | 9/2005 | Okamura | |
| 2005/0250538 A1 | 11/2005 | Narasimhan et al. | |
| 2005/0251451 A1 | 11/2005 | Tan et al. | |
| 2005/0256742 A1 | 11/2005 | Kohan et al. | |
| 2006/0053301 A1 | 3/2006 | Shin | |
| 2006/0165060 A1 | 7/2006 | Dua | |
| 2006/0218397 A1 | 9/2006 | Brown et al. | |
| 2006/0224523 A1 | 10/2006 | Elvitigala | |
| 2007/0089164 A1 | 4/2007 | Gao et al. | |
| 2007/0096946 A1 | 5/2007 | Kim et al. | |
| 2007/0118736 A1 | 5/2007 | Huque | |
| 2007/0168674 A1 | 7/2007 | Nonaka et al. | |
| 2007/0241180 A1 | 10/2007 | Park et al. | |
| 2007/0250920 A1 | 10/2007 | Lindsay | |
| 2008/0017711 A1 | 1/2008 | Adams et al. | |
| 2008/0091944 A1 | 4/2008 | vo Mueller et al. | |
| 2008/0098464 A1 | 4/2008 | Mizrah | |
| 2008/0148186 A1 | 6/2008 | Krishnamurthy | |
| 2008/0165151 A1 | 7/2008 | Lemay et al. | |
| 2008/0189214 A1 | 8/2008 | Mueller et al. | |
| 2008/0244714 A1 | 10/2008 | Kulakowski et al. | |
| 2009/0066543 A1* | 3/2009 | Delia | G06F 3/023 341/23 |
| 2009/0172810 A1 | 7/2009 | Won et al. | |
| 2009/0237361 A1 | 9/2009 | Mosby et al. | |
| 2009/0265776 A1 | 10/2009 | Baentsch et al. | |
| 2009/0271276 A1 | 10/2009 | Roberts | |
| 2009/0307768 A1 | 12/2009 | Zhang et al. | |
| 2010/0024018 A1 | 1/2010 | Koziol et al. | |
| 2010/0109920 A1 | 5/2010 | Spradling | |
| 2010/0127987 A1 | 5/2010 | Liu | |
| 2010/0153273 A1 | 6/2010 | Sellars et al. | |
| 2011/0007008 A1 | 1/2011 | Algreatly | |
| 2011/0071949 A1 | 3/2011 | Petrov et al. | |
| 2011/0090097 A1 | 4/2011 | Beshke | |
| 2011/0185319 A1 | 7/2011 | Carapelli | |
| 2011/0204140 A1 | 8/2011 | Hart et al. | |
| 2011/0219459 A1* | 9/2011 | Andreasson | G06F 21/83 726/28 |
| 2012/0047564 A1 | 2/2012 | Liu | |
| 2012/0054401 A1 | 3/2012 | Cheng | |
| 2012/0084206 A1 | 4/2012 | Mehew et al. | |
| 2012/0084480 A1 | 4/2012 | Reeves et al. | |
| 2012/0095914 A1 | 4/2012 | McKelvey et al. | |
| 2012/0130903 A1 | 5/2012 | Dorsey et al. | |
| 2012/0162124 A1 | 6/2012 | Lin | |
| 2012/0174215 A1 | 7/2012 | Steeves | |
| 2012/0174233 A1* | 7/2012 | Waterson | G06F 21/83 726/26 |
| 2012/0265981 A1 | 10/2012 | Moon et al. | |
| 2012/0268393 A1 | 10/2012 | Lee | |
| 2012/0284194 A1 | 11/2012 | Liu et al. | |
| 2012/0287064 A1 | 11/2012 | Kunori | |
| 2012/0303960 A1 | 11/2012 | Wankmueller et al. | |
| 2013/0046697 A1 | 2/2013 | Schibuk | |
| 2013/0047237 A1 | 2/2013 | Ahn et al. | |
| 2013/0085941 A1 | 4/2013 | Rosenblatt et al. | |
| 2013/0109371 A1 | 5/2013 | Brogan et al. | |
| 2013/0119130 A1 | 5/2013 | Braams | |
| 2013/0144792 A1 | 6/2013 | Nilsson et al. | |
| 2013/0171967 A1 | 7/2013 | Ashour et al. | |
| 2013/0185167 A1 | 7/2013 | Mestre et al. | |
| 2013/0239187 A1 | 9/2013 | Leddy et al. | |
| 2013/0246272 A1 | 9/2013 | Kirsch | |
| 2013/0262248 A1 | 10/2013 | Kim et al. | |
| 2013/0301830 A1* | 11/2013 | Bar-El | H04L 9/08 380/210 |
| 2013/0305392 A1 | 11/2013 | Bar-El et al. | |
| 2013/0328801 A1 | 12/2013 | Quigley et al. | |
| 2013/0332360 A1 | 12/2013 | Quigley et al. | |
| 2013/0332367 A1 | 12/2013 | Quigley et al. | |
| 2013/0333007 A1* | 12/2013 | Chougle | G06F 21/46 726/7 |
| 2013/0333011 A1 | 12/2013 | Quigley et al. | |
| 2014/0020117 A1 | 1/2014 | Nagai et al. | |
| 2014/0025579 A1 | 1/2014 | Nilsson | |
| 2014/0057621 A1 | 2/2014 | Ji et al. | |
| 2014/0096201 A1 | 4/2014 | Gupta | |
| 2015/0095241 A1 | 4/2015 | Edwards | |
| 2015/0100498 A1 | 4/2015 | Edwards | |
| 2015/0249662 A1 | 9/2015 | Iwanski et al. | |
| 2016/0150411 A1 | 5/2016 | Liu et al. | |
| 2016/0275515 A1 | 9/2016 | Quigley et al. | |

FOREIGN PATENT DOCUMENTS

| | | |
|---|---|---|
| CA | 2 925 903 A1 | 4/2015 |
| DE | 10 2007 018 802 B3 | 8/2008 |
| EP | 1 770 575 A1 | 4/2007 |
| EP | 1 806 653 A1 | 7/2007 |
| EP | 2 141 647 A1 | 1/2010 |
| EP | 2 207 124 A2 | 7/2010 |
| FR | 2 693 815 A1 | 1/1994 |
| GB | 2373616 A | 9/2002 |
| JP | 2000-305899 A | 11/2000 |
| JP | 2002-074508 A | 3/2002 |
| JP | 2007-86873 A | 4/2007 |
| KR | 2001-0056090 A | 7/2001 |
| KR | 10-2010-0047097 A | 5/2010 |
| KR | 10-1228088 B1 | 2/2013 |
| KR | 10-1228090 B1 | 2/2013 |
| WO | 98/12615 A2 | 3/1998 |
| WO | 2010/024923 A1 | 3/2010 |
| WO | 2010/097711 A2 | 9/2010 |
| WO | 2011/093998 A1 | 8/2011 |
| WO | 2011/136464 A1 | 11/2011 |
| WO | 2012/122175 A1 | 9/2012 |
| WO | 2013/089717 A1 | 6/2013 |
| WO | 2013/188599 A2 | 12/2013 |
| WO | 2015/017130 A1 | 2/2015 |
| WO | 2015/048040 A1 | 4/2015 |
| WO | 2015/048041 A1 | 4/2015 |

OTHER PUBLICATIONS

"A Guide to EMV—Version 1.0," EMVCo LLC, dated May 2011, pp. 1-35.

"EMV Essentials for US Credit Unions," A Mercator Advisory Group Research Brief Sponsored by CSCU, dated Mar. 22, 2012, pp. 1-15.

"MasterCard PayPass, Terminal Implementation Requirements," Mastercard Worldwide, 2007 v.1, on Sep. 10, 2015, pp. 1-62.

Fillmore, P., "Mobile and Contactless Payment and Security," v20111118, Witham Laboratories, on Nov. 18, 2011, pp. 1-39.

Non-Final Office Action mailed Aug. 12, 2014, for U.S. Appl. No. 13/800,920, of Quigley, O.S.C., et al., filed Mar. 13, 2013.

Final Office Action mailed Feb. 18, 2015, for U.S. Appl. No. 13/800,920, of Quigley, O.S.C., et al., filed Mar. 13, 2013.

Non-Final Office Action mailed May 21, 2015, for U.S. Appl. No. 13/800,920, of Quigley, O.S.C., et al., filed Mar. 13, 2013.

Non-Final Office Action mailed Oct. 1, 2015, for U.S. Appl. No. 13/799,724, of Quigley, O.S.C., et al., filed Mar. 13, 2013.

Non-Final Office Action mailed Oct. 1, 2015, for U.S. Appl. No. 13/800,610, of Quigley, O.S.C., et al., filed Mar. 13, 2013.

Non-Final Office Action mailed Oct. 7, 2015, for U.S. Appl. No. 13/800,789, of Quigley, O.S.C., et al., filed Mar. 13, 2013.

Final Office Action mailed Oct. 21, 2015, for U.S. Appl. No. 13/800,920, of Quigley, O.S.C., et al., filed Mar. 13, 2013.

Non-Final Office Action mailed Nov. 4, 2015, for U.S. Appl. No. 14/696,235, of Quigley, O.S.C., et al., filed Apr. 24, 2015.

(56) References Cited

OTHER PUBLICATIONS

International Search Report and Written Opinion mailed Oct. 31, 2014, for International Patent Application No. PCT/US2014/046923, filed Jul. 16, 2014.
International Search Report and Written Opinion mailed Jan. 12, 2015 for International Patent Application No. PCT/US2014/057050, filed Sep. 23, 2014.
International Search Report and Written Opinion mailed Jan. 12, 2015 for International Patent Application No. PCT/US2014/057047, filed Sep. 23, 2014.
Final Office Action mailed Apr. 22, 2016, for U.S. Appl. No. 13/800,610, of Quigley, O.S.C., et al., filed Mar. 13, 2013.
Final Office Action mailed Jun. 17, 2016, for U.S. Appl. No. 14/696,235, of Quigley, O.S.C., et al., filed Apr. 24, 2015.
Non-Final Office Action mailed Jun. 23, 2016, for U.S. Appl. No. 14/105,006, of Edwards, T.J., filed Dec. 12, 2013.
Co-Pending U.S. Appl. No. 14/055,838 by McCauley, N.P. et al., filed Oct. 16, 2013.
Zezschwitz, E. V., et al., "Making Graphic-Based Authentication Secure against Smudge Attacks," Session: Emotion and User Modeling, IUI'13, dated Mar. 19-23, 2013, pp. 277-286.
Advisory Action mailed Jan. 22, 2016, for U.S. Appl. No. 13/800,920, of Quigley, O.S.C., et al., filed Mar. 13, 2013.
Final Office Action mailed Feb. 4, 2016, for U.S. Appl. No. 13/799,724, of Quigley, O.S.C., et al., filed Mar. 13, 2013.
Notice of Allowance mailed Mar. 11, 2016, for U.S. Appl. No. 13/800,920, of Quigley, O.S.C., filed Mar. 13, 2013.
Notice of Allowance mailed Mar. 23, 2016, for U.S. Appl. No. 13/800,789, of Quigley, O.S.C., filed Mar. 13, 2013.
Non-Final Office Action mailed Mar. 24, 2016, for U.S. Appl. No. 14/041,863, of Edwards, T.J., filed Sep. 30, 2013.
Non-Final Office Action mailed Mar. 24, 2016, for U.S. Appl. No. 14/050,233, of Edwards, T.J., filed Oct. 9, 2013.
Non-Final Office Action mailed Apr. 18, 2016, for U.S. Appl. No. 14/050,216, of Edwards, T.J., filed Oct. 9, 2013.
Notice of Allowance mailed Oct. 3, 2016, for U.S. Appl. No. 14/041,863, of Edwards, T.J., filed Sep. 30, 2013.
Final Office Action mailed Oct. 4, 2016, for U.S. Appl. No. 14/050,233, of Edwards, T.J., filed Oct. 9, 2013.
Advisory Action mailed Oct. 4, 2016, for U.S. Appl. No. 14/696,235, of Quigley, O.S.C., et al., filed Apr. 24, 2015.
Non-Final Office Action mailed Nov. 18, 2016, for U.S. Appl. No. 15/169,260, of Quigley, O.S.C., et al., filed May 31, 2016.
Notice of Allowance mailed Nov. 23, 2016, for U.S. Appl. No. 14/050,216, of Edwards, T.J., filed Oct. 9, 2013.
Advisory Action mailed Dec. 20, 2016, for U.S. Appl. No. 14/050,233, of Edwards, T.J., filed Oct. 9, 2013.
Final Office Action mailed Dec. 23, 2016, for U.S. Appl. No. 14/105,006, of Edwards, T.J., filed Dec. 12, 2013.
Examination Report No. 1 for Australian Patent Application No. 2014327030, mailed Dec. 2, 2016.
Examination Report No. 1 for Australian Patent Application No. 2014327031, mailed Dec. 7, 2016.
Extended European Search Report for European Patent Application No. 14832098.9, mailed Dec. 14, 2016.
Park, Y.S., and Han, S.H., "Touch key design for one-handed thumb interaction with a mobile phone: Effects of touch key size and touch key location," International Journal of Industrial Ergonomics, vol. 40, Issue 1, pp. 68-76 (Jan. 1, 2010).
Non Final Office Action mailed Jan. 13, 2017, for U.S. Appl. No. 14/696,235, of Quigley, O.S.C., et al., filed Apr. 24, 2015.
Examiner Requisition for Canadian Patent Application No. 2,925,747, mailed Jan. 19, 2017.
Examiner Requisition for Canadian Patent Application No. 2,925,903, mailed Feb. 3, 2017.
Non Final Office Action mailed Feb. 10, 2017, for U.S. Appl. No. 14/055,838, of McCauley, N.P., et al., filed Oct. 16, 2013.
Non Final Office Action mailed Feb. 24, 2017, for U.S. Appl. No. 14/050,233, of Edwards, T.J., filed Oct. 9, 2013.
Non Final Office Action mailed Mar. 14, 2017, for U.S. Appl. No. 13/800,610, of Quigley, O.S.C., et al., filed Mar. 13, 2013.
Intention to Grant for European Patent Application No. 13734545.0, mailed Mar. 9, 2017.
Examination Report No. 1 for Australian Patent Application No. 2014296635, mailed Feb. 13, 2017.
Extended European Search Report for European Patent Application No. 14848803.4, mailed Feb. 3, 2017.
Extended European Search Report for European Patent Application No. 14848354.8, mailed Feb. 3, 2017.

* cited by examiner

FAKE SENSOR INPUT FOR PASSCODE ENTRY SECURITY

BACKGROUND

Security in accessing and transmitting information is as crucial as security to protect physical possessions. Conventional security devices, such as number locks, may include devices that control access based on possession of a virtual "key," such as in the form of private information (e.g., a passcode). A passcode is a combination of a sequence of characters, such as letters, numbers, special characters, or any combination thereof. In the digital realm, passcode-based locks are emulated by digital passcode-based security devices, such as by an automatic teller machine (ATM) key pad or a debit card personal identification number (PIN) key pad. These digital passcode-based security devices are generally specialized hardware devices (i.e., lacking a general purpose operating system/kernel to run different functional components) that control access to a system based on a user's knowledge of a passcode. Conventional digital passcode-based security devices are implemented on specialized devices because, among other reasons, any general-purpose device may enable installations of malware (i.e., software design for the purpose of overcoming security without authorization).

For example, in a conventional point-of-sale electronic payment card transaction, e.g., by a debit card or smart card such as a Europay, MasterCard, and Visa (EMV) card, a cardholder's identity and/or authenticity is confirmed by requiring an entry of a PIN rather than or in addition to signing a paper receipt. A user can enter a PIN on a specialized card reader. The card reader then retrieves a PIN from the smart card. The PIN entered by a user is then compared against the retrieved PIN from the smart card. Authorization of the use of the card can be granted based on the entered PIN matching the retrieved PIN.

The example above uses a specialized device to authorize a user instead of a general-purpose device, which has an operating system enabling any third party applications to run thereon. A general-purpose device enables ease of implementation of security sensitive applications. The ability to use general-purpose devices to implement a passcode-based authentication system enables merchants and consumers who wish to use or implement a secured authentication system to use devices they already own for that purpose. However, making the card reader part of a general-purpose device may be unfeasible because of inability to defend against malware's installation on the same general-purpose device. A particular form of malware is a key logging application. A key logging application may attempt to record a passcode on the general-purpose device. This type of attack may be referred to as "passcode logging." Unlike malwares that directly attack a passcode entry application, the key logging malware may monitor an input device for a time period without detection in an attempt to obtain the passcode. The threat of key logging malware serves as yet another obstacle to use of a general-purpose device as a security device to protect information and access, particularly in the context of processing a payment by use of a payment card.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A passcode logging prevention technique is disclosed herein ("the disclosed technique"). The disclosed technique involves generating fake sensor entries from an input device to prevent a security breach when a user enters a sensitive passcode for authentication, such as while processing a payment using a payment card, while enabling authorized system components to distinguish the fake sensor entries from the actual sensor entries. The actual sensor entries represent a user entry of the passcode. The fake sensor entries serve to confuse and generate "noise" from the perspective of any keylogging malware that may be present, thus preventing the malware from successfully mapping the sensor entries to the passcode.

The input device can be, for example, a touch screen, a microphone, a camera, an accelerometer, a gesture detection device, another input device on an electronic device, or any combination thereof. The input device may be integral to or coupled to an electronic device. The electronic device, for example, may be a smart phone, a laptop computer, a tablet computer, an e-reader, or other portable device.

The fake sensor entries may be introduced at, for example, a network-level, an application programming interface level, a memory level, an application level, a kernel level, a hyper-visor level, a driver level, a firmware level, or any combination thereof. Because software-based keylogging malware may be introduced at any of the above mentioned levels, the fake sensor entries may also be introduced at any of the above mentioned levels to prevent successful keylogging of a user's passcode.

As a specific example, the disclosed technique involves introducing fake touch events into an input stream from a touch screen of an electronic device. The touch screen may be, for example, based on sensing technology that is capacitive, resistive, optical, acoustic, piezoelectric, or any combination thereof. For example, the touch events may include (X,Y) location coordinates of where a touch is detected on the touch screen. Other examples of the sensor events where the disclosed technique can apply may include voice entry (e.g., input via recognition), gesture entry (e.g., via gesture recognition), vibration entry, eye tracking, or other methods of direct or indirect user input. The fake sensor entries may be raw data or processed data. As a specific example, fake voice entries may be introduced as audio noise in an audio stream from a microphone. Alternatively, the fake voice entries may be fake syllables in a voice recognition processing buffer containing recognized syllables from the audio stream. The processing buffer may include the syllables "two," "two," "three," and "four" as part of a voice PIN entry, and a fake syllable of "one" can be inserted into the processing buffer. As another specific example, fake gesture entries may include image noise in an input stream from a video camera for gesture recognition or fake gesture entries in a gesture recognition driver storing discrete recognized gesture patterns.

As an example, a sensor input stream (e.g., a touch event stream) may be delivered to an input device driver on an operating system of the electronic device. The sensor input stream is a sequence of sensor entries. An application on the operating system can then access the sensor input stream or respond to an interrupt signal caused by the input device driver. In one embodiment, a noise introduction module enables the sensor input stream to be modified such that additional fake sensor events (e.g., fake touch events) are introduced into the input stream. The fake sensor events can be introduced, for example, only while the passcode is requested on an interface of the electronic device, or they can be introduced continuously, periodically, or randomly even when the passcode entry interface is absent.

The noise introduction module can introduce fake sensor inputs in any of a variety of ways, such as writing to memory locations where touch events are stored. For example in some implementations, a touch screen driver may monitor for incoming touch events in a driver buffer. The noise introduction module may introduce fake touch events directly into the driver buffer.

The noise introduction module can also introduce fake sensor inputs by emulating a data source (e.g., the input sensor hardware) or one or more data relay points (e.g., the input device driver or an application service) of the touch events. In some embodiments, an input sensor's firmware (e.g., touch screen firmware) may be modified to transmit actual and fake sensor entries to the processor of the electronic device as the input device (e.g., the touch screen) receives incoming sensor events (e.g., touch events). In these embodiments, the noise introduction module may emulate the sensor device or the input device driver to transmit fake sensor events to the processor.

The introduction of fake sensor events may be patterned to enable one or more methods for distinguishing fake sensor events from actual sensor events. As an example, part of or all of the sensor measurement data of the fake sensor events may be patterned. For example, where the fake sensor events are fake touch events on a touch screen, the X coordinate, the Y coordinate, or both may be generated to be divisible by a specific number, or to always be an odd, even, or primary number. Further, one or more of the coordinates may be verifiable as part of the pattern via a specific algorithm based on a mathematical equation of known variables.

As a specific example, a touch screen may record touch events at the locations (1,1); (2,1); and (3,1) resulting in a touch event sequence of three entries. Next, fake sensor events may be introduced in the form of fake touch screen coordinates. Random coordinates that are divisible by the number "5," for example, may be introduced into the touch event sequence, such as the coordinates (5,0) and (5,5), resulting in a touch event sequence of more than the original three entries, such as (1,1); (5,0); (2,1); (5,5); and (3,1). The pattern of having the coordinates be divisible by the number "5" may serve to distinguish the actual entries from the fake entries and/or vice versa at a later time.

As another example, either the fake sensor events or the actual sensor events may be introduced with a metadata tag pattern. For example, the metadata tag pattern may be a pattern of the time stamp of the sensor events (e.g., a timing pattern). The timing pattern, for example, may be synchronized with a system clock, a clock signal from the input device, or an external system. In some embodiments, for the case of the actual sensor events, the time of record of each sensor event may be adjusted to match the time pattern.

The time pattern, for example, may be a relative time. For example, the time pattern may be a pattern of time differences between each fake event or a pattern of time differences between each actual sensor event. As another example, the time pattern may be a pattern of time differences before each fake event or before each actual sensor event.

Figure 1:
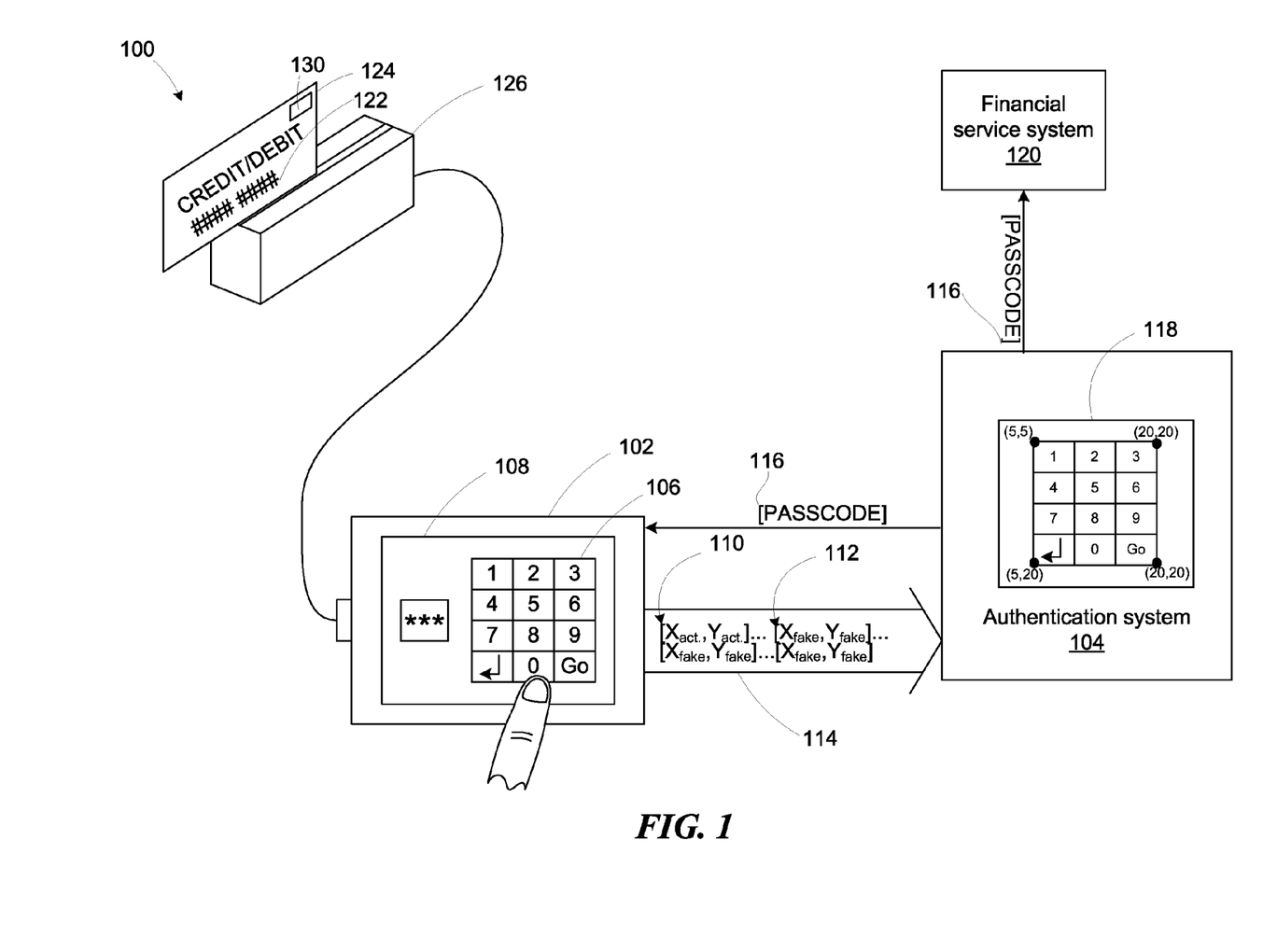
FIG. 1 is a data flow diagram illustrating a technique of preventing passcode logging by use of fake sensor inputs.

FIG. 1 is a data flow diagram illustrating a technique 100 of preventing passcode logging by use of fake sensor inputs. As shown, the passcode logging prevention technique 100 includes an electronic device 102 and an authentication system 104. The electronic device 102 may be a general purpose device with data processing capabilities. For example, the electronic device 102 may be a mobile phone, a tablet, an e-reader, other mobile or portable computing devices, or other stationary computing devices. The authentication system 104 may be a trusted computing system in data communications with the electronic device 102, such as over a network. The authentication system 104 may be one or more computing devices. For example, the authentication system 104 may be a server computer, a network of computing systems, a cloud computing environment, a virtualized computing environment, or any combination thereof. Communication between the authentication system 104 and the electronic device 102 may be any form of data communication, including mobile telecommunication (e.g., cellular), WiFi, wireless Ethernet, wired Ethernet, or any other form of Internet connection.

The electronic device 102 may be a mobile device, such as a smartphone or a tablet computer, that presents a passcode interface 106 on an output device. In the illustrated embodiment, the output device is a touch screen 108. A user seeking authentication may input through a sensor (i.e., an input device) of the electronic device 102, a series of inputs composing a passcode, such as a PIN, a passphrase, a digital key, or any combination thereof. In the illustrated embodiment, the sensor is the touch screen 108. Note, however, that the sensor (e.g., a touch panel or a cursor device) for detecting an input may be different from the output device (e.g., a display, a projection device, a speaker, or other devices capable of presenting the passcode interface 106).

Figure 4:
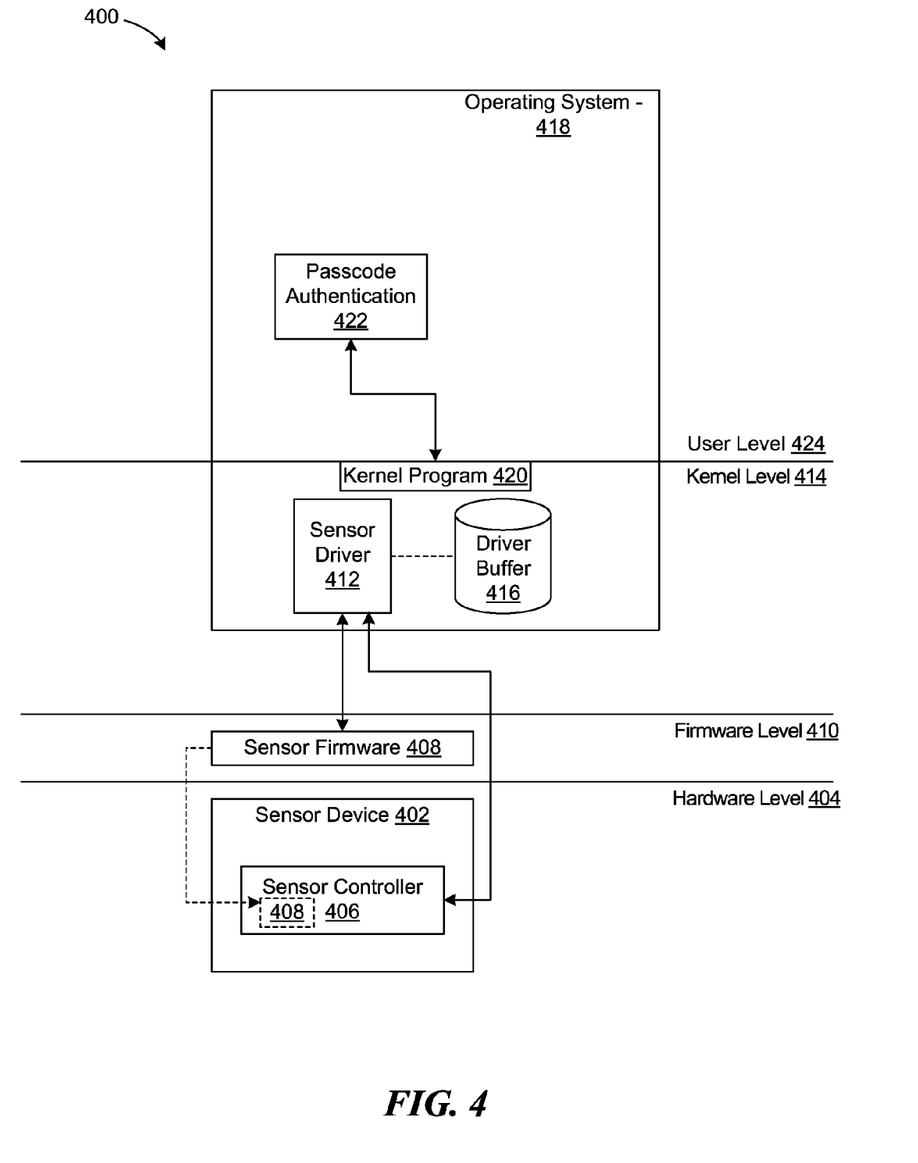
FIG. 4 is a system architecture diagram of an electronic device illustrating a data path through which a sensor entry may be processed.

As each actual sensor entry 110 is captured by the sensor, the actual sensor entry 110 is routed to an operating system of the electronic device 102 for processing. Fake sensor entries 112 can be introduced at any level along this data route. The data route traverses through a software stack of the electronic device 102 as illustrated in FIG. 4.

The actual sensor entries 110 and the fake sensor entries 112 together form a sensor input stream 114, such as a touch event stream. The sensor input stream 114 is a sequence of sensor entries. The sensor input stream 114 may be associated with a single user, a single session, a single application, or any combination thereof. When the passcode interface 106 is presented on the touch screen 108, the electronic device 102 captures and interprets the sensor input stream 114.

In various embodiments, a portion of the sensor input stream 114 may be sent to the authentication system 104 for deciphering. In various embodiments, when the authentication system 104 receives the portion of the sensor input stream 114, the authentication system 104 may filter/subtract out the fake sensor entries 112 prior to deciphering the passcode entry 116 by the user from the sensor input stream 114. A passcode interface configuration 118, which defines the mechanism of interaction with the passcode interface, may be generated by the electronic device 102 and then sent over to the authentication system 104 as well. The passcode interface configuration may specify a mapping between sensor values of the sensor entries and a set of characters used to compose a passcode entry. As an example, where the passcode interface is displayed on the touch screen 108, the passcode interface configuration may include geometric definition of the passcode interface on the touch screen 108. In other embodiments, the passcode interface configuration may be generated by the authentication system 104.

In other embodiments, the sensor input stream 114 may be filtered at the electronic device 102 to remove the fake sensor entries 112 prior to sending the sensor input stream 114 over to the authentication system 104. Once the authentication system 104 receives a portion of the filtered sensor input stream, the sensor entries in the input stream can then be examined in relation to with the passcode interface configuration 118 to determine the passcode entry 116 of the user. Various methods of distinguishing the fake sensor entries 112 from the actual sensor entries 110 are described further below.

In various embodiments, the portion of the sensor input stream 114 may be interpreted to produce a passcode entry 116 by comparing the sensor input stream 114 to a known passcode interface configuration 118. The authentication system 104 can decipher which character or set of characters corresponds to the filtered sensor input stream. The authentication system 104 can then aggregate the deciphered characters or sets of characters in sequence to form a passcode entry 116. The passcode entry 116 corresponds to the passcode entered by the user in response to the presentation of the passcode interface.

This technique can be applied, for example, in financial transaction authentication processes. To authenticate a user via a passcode entry, the passcode entry 116 can be compared against an authentic passcode corresponding to an authorized user. For example, the authentic passcode may be stored in a financial service system 120. In some embodiments, the financial service system 120 includes the authentication system 104. In some embodiments, the deciphering of the passcode entry 116 is performed by modules on the electronic device 102 instead of by the authentication system 104.

The authorized user and the authentic passcode may be associated with a payment card identity 122. The payment card identity 122 may correspond to a specific debit card or a credit card. In the illustrated example, the payment card identity 122 is stored on a payment card 124. The payment card identity 122 is extracted via a card reader 126. The card reader 126 is coupled to the electronic device 102, such as via a wired interconnect or wirelessly. The payment card identity 122 and other non-passcode related data are transferred to the electronic device 102. In various embodiments, the payment card identity 122 and other non-passcode related data are encrypted. The payment card identity 122 and other non-passcode related data are then shared with the authentication system 104. Based on the payment identity 120 and the passcode entry 116, the authentication system 104 communicates with the financial service system 120 to confirm the identity and the authorization of the user, such as the payment of the user.

In other embodiments, the authentic passcode may be stored on the payment card 124. For example, an EMV credit card may include an integrated circuit (IC) chip 130 containing the authentic passcode associated with the user of the EMV credit card. Authorization of the user to use the EMV credit card may require a comparison of the passcode entry 116 and the authentic passcode on the IC chip 130 of the EMV credit card. Hence, the authentication system 104 may send the passcode entry 116 to the electronic device 102 once the passcode entry 116 is deciphered. The passcode entry 116 sent back to the electronic device 102 may be encrypted as well. The passcode entry 116 can then be sent to the IC chip 130 for comparison.

Figure 2:
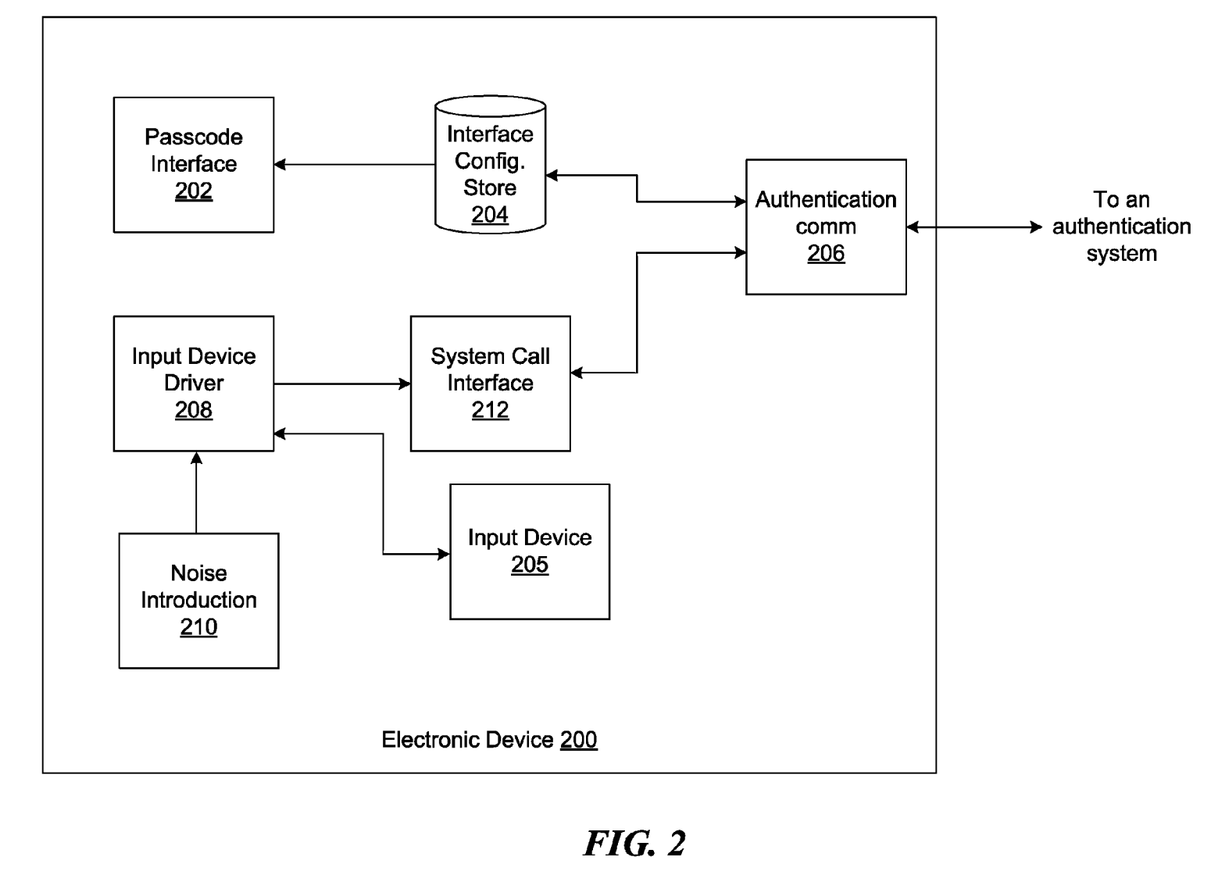
FIG. 2 is a block diagram illustrating an electronic device for passcode entry.

FIG. 2 is a block diagram illustrating an electronic device 200, which may represent device 102 in FIG. 1, for passcode entry. The electronic device 200 may be a general-purpose computing device. The electronic device 200 includes various modules and storage as described below. The electronic device 200 includes a passcode interface module 202, which is configured to present and maintain a passcode interface.

In various embodiments, the passcode interface module 202 is configured to generate the passcode interface. The passcode interface module 202 may generate the passcode interface randomly or pseudo-randomly. As an example, the passcode interface may be configured as a PIN pad layout. The size, arrangement, position, orientation, shape, and other absolute or relative geometric characteristics of the passcode interface and elements within the passcode interface are all examples of the passcode interface configuration. The passcode interface configuration may be selected to promote concealment of a user's entry of a passcode on the passcode interface. For example, the elements on the passcode interface may be characters from which the passcode combination (e.g., the passcode entry 116) may be chosen. The arrangement of the characters and the geometric shapes and sizes of the characters may be randomized. Other attributes of the passcode interface configuration may be wholly or partially randomly generated. The passcode interface configuration, such as the absolute and relative (e.g., relative to a display of the electronic device 200) geometric characteristics of the passcode interface, may be stored in an interface configuration store 204.

In other embodiments, the passcode interface configuration may be provided by a remote system through a network, such as the authentication system 104 of FIG. 1. For example, the passcode interface configuration may be received through an authentication communication module 206. In those embodiments, once received, the passcode interface configuration may be stored in the interface configuration store 204. The passcode interface configuration may then be used by the passcode interface module 202 to present the passcode interface to the user.

When the passcode interface configuration is generated on the electronic device 200, the authentication communication module 206 may transmit the passcode interface configuration to the remote system such that the remote system may use a portion of the sensor input stream and the passcode interface configuration to decipher the passcode entry.

The passcode interface module 202 may further be configured to present the passcode interface in a variety of ways. As an example, the presentation of the passcode interface may include displaying or rendering the passcode interface on a touch screen in accordance with the passcode interface configuration, such as a layout configuration. The passcode interface module 202 may render the passcode interface in a two-dimensional or three-dimensional manner. The passcode interface module 202 may also present the passcode interface in other ways, including presenting the passcode interface through animation, audio, webpage, widget, other passive or interactive multimedia, or any combination thereof.

The passcode interface module 202 may be configured to maintain feedback based on an interactivity between the passcode interface and a user. For example, the passcode interface module 202 may be coupled to a touch screen of the electronic device 200, such as the touch screen 108 of FIG. 1. The interactivity enables the passcode interface to provide feedback as a user enters a character or a set of characters to be part of the passcode entry.

A record of interactivity is captured with an input device 205, such as the touch screen 108 of FIG. 1. The input device 205 is controlled by an input device driver 208 of the electronic device 200. The input device driver 208 may run on a kernel level of an operating system of the electronic device 200.

In various embodiments, the input device driver 208 captures an input stream from the input device 205. The input device 205 may include any input hardware (i.e., one or more sensors) capable of detecting an sensor entry which implicates (i.e., indicative of) a user's interaction with the passcode interface. The sequence of sensor entries received may constitute the input stream.

The electronic device 200 may include a noise introduction module 210. The noise introduction module 210 receives the input stream directly or indirectly from the input device driver 208. For example, the noise introduction module 210 may access a driver buffer of the input device driver 208 containing the input stream. As another example, the noise introduction module 210 may respond to an interrupt raised by the input device driver 208 on the kernel level of the operating system. As yet another example, the noise introduction module 210 may be part of an operating system level library of which interfaces with the drivers on one end and with user-level applications on another.

The noise introduction module 210 is configured to insert fake sensor entries into the input stream. The noise introduction module 210 may introduce the fake sensor entries prior to an application's access to the input stream; for example, the fake sensor entries can be inserted into the driver buffer, an application memory, other system memory. As another example, the fake sensor entries may be generated dynamically whenever the sensor input stream is requested.

In various embodiments, the noise introduction module 210 may insert the fake sensor entries in accordance with a pattern in order to facilitate an authorized application to distinguish an actual sensor entry from a fake sensor entry. In other embodiments, the noise introduction module 210 may modify the actual (i.e., original) sensor entries with a metadata tag and/or configure the fake sensor entries with a metadata tag to distinguish the actual sensor entries from the fake sensor entries. In yet other embodiments, the noise introduction module 210 may modify existing metadata tags of either the fake sensor entries and/or the actual sensor entries to distinguish the actual sensor entries from the fake sensor entries.

In some embodiments, the noise introduction module 210 inserts at least a fake sensor entry for every actual sensor entry. In some embodiments, the noise introduction module 210 inserts at least a fake sensor entry with a timestamp within a time period when a user is entering a passcode entry on the passcode entry interface.

The authentication communication module 206 is configured to request a sensor input stream from a system call interface module 212 of the electronic device 200. The system call interface module 212 may be part of an operating system kernel of the electronic device 200. The system call interface module 212 may respond to the request by retrieving the sensor input stream from the input device driver module 208. In various embodiments, the noise introduction module 210 may be implemented with the system call interface module 212, where the noise introduction module 210 may generated the fake sensor entries dynamically upon request from the authentication communication module 206 and/or other applications.

In response to receiving the sensor input stream, the authentication communication module 206 may be configured to send a portion of the sensor input stream to an external authentication system, such as the authentication system 104 of FIG. 1, through a network. The portion may be selected from sensor entries recorded while presenting the passcode interface on the electronic device 200. In some embodiments, the authentication communication module 206 identifies the actual sensor entries from the portion of the sensor input stream prior to sending the portion to the authentication system 214. In other embodiments, the portion of the sensor input stream including at least a fake sensor entry is transmitted to the authentication system 214.

The interface configuration store 204 described may be implemented in one or more hardware memory components or portions of the hardware memory components. The interface configuration store 204 may be implemented as a dynamic database service or a static data structure. The store can be implemented by a single physical device or distributed through multiple physical devices. The storage space of the store can be allocated at run-time of the modules described above, such as the passcode interface application 202.

Figure 3:
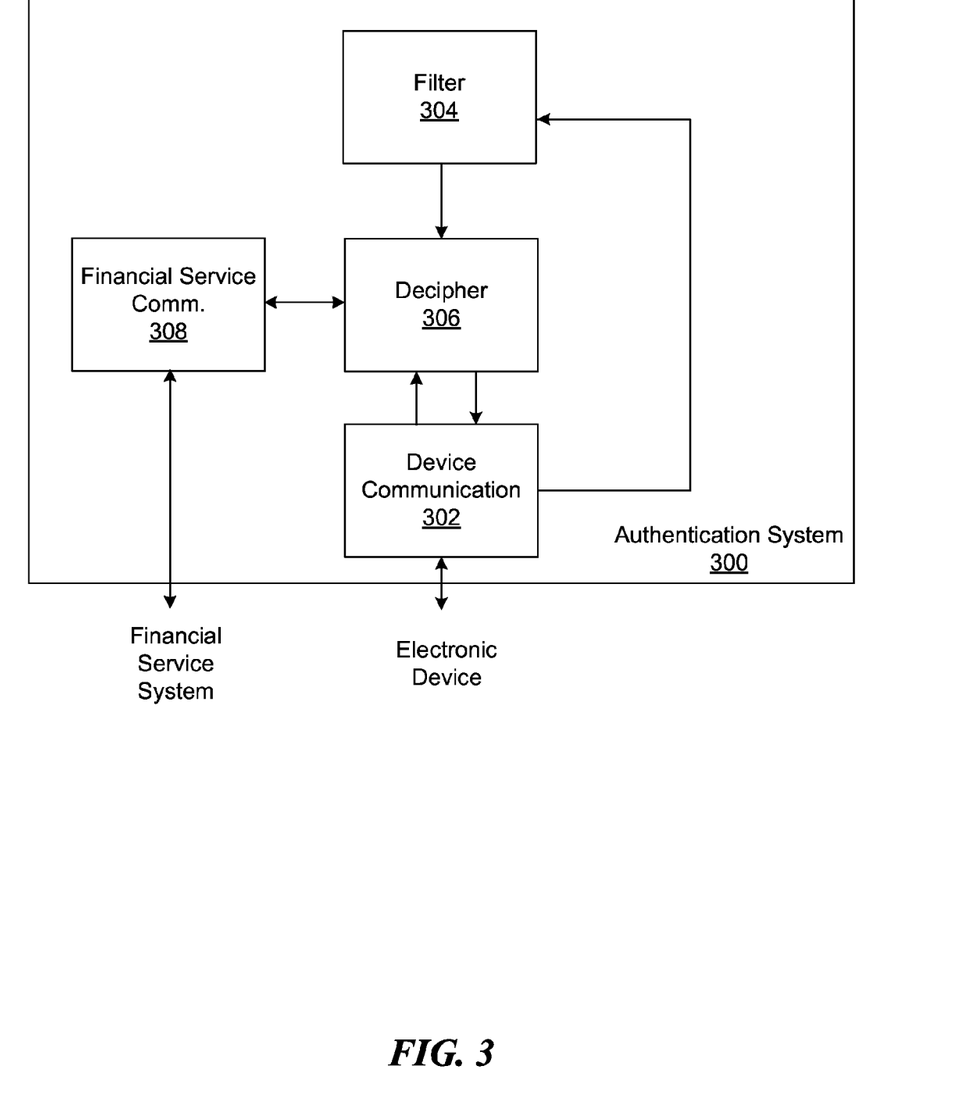
FIG. 3 is a block diagram illustrating an authentication system.

FIG. 3 is a block diagram illustrating an authentication system 300. As shown in FIG. 3, the authentication system 300 includes a device communication module 302 configured to communicate with an electronic device, such as the electronic device 200 of FIG. 2. For example, the device communication module 302 may receive a sensor input sequence, such as a touch event sequence, from an electronic device, such as the electronic device 200.

The authentication system 300 includes a filter module 304. The filter module 304 is configured to distinguish actual sensor entries from fake sensor entries and remove the fake sensor entries from the sensor input sequence. For example, the filter module 304 may be configured to remove fake sensor entries from the sensor input sequence.

The fake sensor entries may be in accordance with a pattern in terms of content value, such as the raw sensor measurements. For example, where the sensor input sequence is a touch event sequence, a coordinate for each touch event may include a X-coordinate value and a Y-coordinate value. The X and/or Y coordinate values may be assigned based on the pattern. In various embodiments, values in accordance with the pattern follow a verifiable numeric characteristic, e.g., being divisible by a constant, being part of a known sequence of numbers, being a prime number, etc., or a constant sequence of numeric values, e.g., Fibonacci sequence or a sequence of number generated by a random number generator with a constant seed.

In some embodiments, metadata of the fake sensor entries is in accordance with a pattern. For example, each fake sensor entries may include a uniquely identifiable metadata tag. As another example, an existing metadata tag, such as a timestamp or source indicator, may follow the pattern. As a specific example, the timestamp of each fake sensor entry may fall exactly 10 millisecond from a previous sensor entry, regardless of whether the previous sensor entry is fake or not.

In various embodiments, the filter module 304 is configured to distinguish actual sensor entries based on either the content data or the metadata of the fake sensor entries. In other embodiments, the filter module 304 is configured to distinguish actual sensor entries from fake sensor entries based on metadata of the actual sensor entries. For example, the noise introduction module 210 of FIG. 2 may be configured to modify the metadata of the actual sensor entries in accordance with a pattern. Accordingly, the filter module 304 may be configured to identify the actual sensor entries based on a metadata tag of each actual sensor entry.

As shown in FIG. 3, the authentication system 300 includes a decipher module 306. The decipher module 306 is configured to decipher a passcode entry from a user based on a sensor input sequence. For example, the decipher module 306 may receive the filtered sensor input sequence from the filter module 304. Alternatively, the decipher module 306 may receive the sensor input sequence directly from the device communication module 302 when the received sensor input sequence is pre-filtered. In some embodiments, the decipher module 306 also receives a passcode interface configuration from the electronic device through the device communication module 302. In other embodiments, the decipher module 306 accesses a known passcode interface configuration that is stored on the authentication system 300.

The decipher module 306 may determine a passcode entry by a user based on the filtered sensor input sequence and the passcode interface configuration. For example, where the passcode interface is a keypad and the sensor input sequence are touch events, the decipher module 306 may map the touch coordinates of the touch events to known character elements arranged on the keypad. The sequence of interpreted character elements may then be deciphered to be the passcode entry by the user.

The passcode entry may be passed back to the electronic device through the device communication module 302 to be verified, such as to be verified by a card reader attached to the electronic device. The passcode entry may also be passed out to a financial service system to be verified through a financial service communication module 308, where the financial service communication module 308 is configured to communicate with an external financial service system, such as the financial service system 120 of FIG. 1.

One or more modules on the electronic device 200 may be implemented on the authentication system 300 and one or more modules of the authentication system 300 may be implemented on the electronic device 200. For example, the filter module 304 of the authentication system 300 may be implemented on the electronic device 200, where the sensor input sequence received at the device communication module 302 no longer include fake sensor entries. As another example, the decipher module 306 may be implemented on the electronic device 200.

In some embodiments where the decipher module 306 is implemented on the electronic device 200, the noise introduction module 210 inserts fake character entries to any storage of the passcode entry. For example, where the decipher module 306 has interpreted the passcode entry, the passcode entry may be stored on memory of the electronic device 200. As a specific example, the actual passcode entry may be interpreted to be "1234," but one or more fake character entries such as the numeric "0" may be inserted resulting the stored passcode entry to be "1020304."

FIG. 4 is a system architecture diagram of an electronic device 400, such as the electronic device 102 or the electronic device 200, illustrating a data path through which a sensor entry may be processed. The electronic device 400 includes a sensor device 402 that can record a sequence or a stream of sensor entries, such as coordinates of a detected touch on a touch screen ("touch events"), at a hardware level 404. The hardware level 404 includes at least a physical hardware component of the electronic device 400 that is either coupled to the electronic device 400 or integral to the electronic device. The sensor device 402 may be a touch screen, for example. The sensor device 402 may include a sensor controller 406. The sensor controller 406, for example, can be a specialized integrated circuit for controlling one or more sensors within the sensor device 402. The sensor controller 406, for example, can be a field programmable gate array (FPGA), a programmable microcontroller, or an application specific IC (ASIC). The sensor controller 406 may execute a sensor firmware 408. Operations of the sensor firmware 408 may be considered to be within a firmware level 410 of the system architecture.

The sensor firmware 408 or the sensor controller 406 may transmit the sensor entry to a sensor device driver 412 at a kernel level 414 of the system architecture. The sensor device driver 412 may be coupled to a driver buffer 416, which is a memory space to store incoming sensor inputs. The sensor entry received by the sensor device driver 412 may be stored in the driver buffer 416. The sensor device driver 412 is a computer program that operates or controls the sensor device 402 on behalf of an operating system 418 of the electronic device 400. The sensor device driver 412 may communicate with the sensor controller 406 or the sensor firmware 408 through a bus or other wired or wireless communication system.

As shown in FIG. 4, the operating system 418 running on the electronic device 400 includes a kernel program 420. The kernel program 420 is a computing program that manages input/output requests from software running on the electronic device 400, and translates the requests into data processing instructions for a central processing unit (CPU) and/or other electronic components of the electronic device 400. For example, the kernel program 420 may serve as a system call interface service to a passcode authentication application 422 running on a user level 424 of the operating system 418. The kernel program 420 enables certain programs including device drivers (e.g., the sensor device driver 412) to run on the kernel level 414 with different privileges and/or constraints compared an application on the user level 424. Modules running on the kernel level 414 may have higher execution privileges, have separate address spaces, have parallel execution threads (e.g., instead of sequential execution), have the capability of interrupt based processes, can shared data with each other, can be pre-emptible, or any combination thereof.

The passcode authentication application 422, such as the authentication communication module 206 of FIG. 2, may communicate with the sensor device driver 412 through the kernel program 420. For example, the passcode authentication application 422 may access the sensor entries in the sensor input stream provided by the sensor device 402. Introduction of fake sensor entries may occur at the firmware level 410, the kernel level 414, the user level 424, or any combination thereof, consistent with the disclosed technique herein. The fake sensor entries are advantageous in obfuscating the actual sensor inputs from the perspective of any potential malware running either on the kernel level 414 or the user level 424. Distinguishing of actual sensor entries from fake sensor entries may occur on the electronic device 400 or on a remote server over a network, such as the authentication system 300 of FIG. 3.

Figure 5:
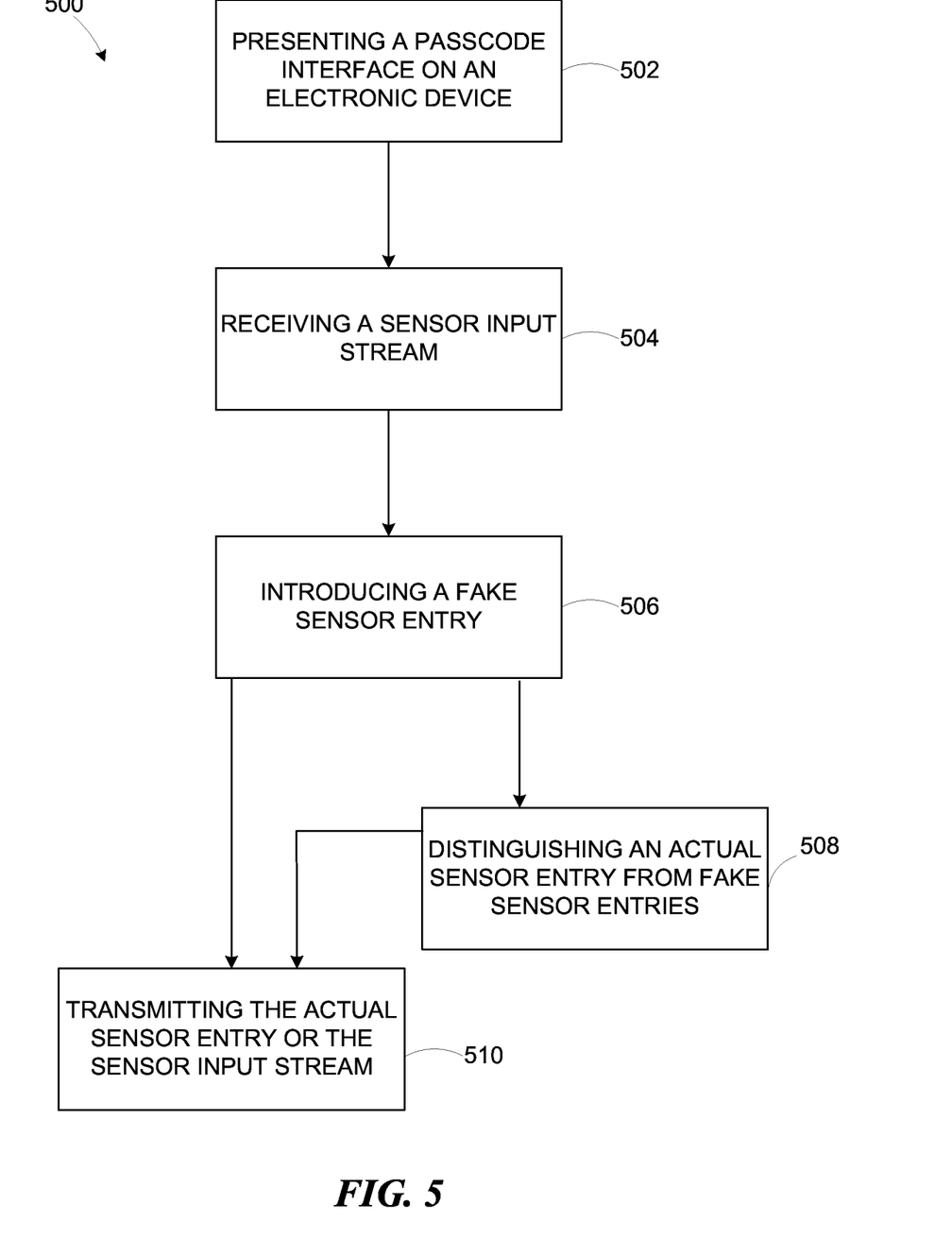
FIG. 5 is a flow chart of a process of operating an electronic device to prevent passcode logging.

FIG. 5 is a flow chart of a process 500 of operating an electronic device, such as the electronic device 102, the electronic device 200, or the electronic device 400, to prevent passcode logging. The process 500 begins with presenting a passcode interface on an electronic device at step 502. For example, the passcode interface presented may be a keypad for authenticating a user for payment to/from a financial service system. Step 502 may be performed by the passcode interface module 202. The passcode entry interface may be presented in response to initiation of a financial transaction on the electronic device, such as when a card reader, coupled to the electronic device, detects a swipe of a payment card by a user.

A sensor input stream from a sensor of the electronic device is received at step 504. The sensor entries from the sensor input stream may represent or be indicative of a user's interaction with the passcode interface. For example, the sensor input stream can be a touch event stream from a touch screen of the electronic device. Each touch event may include a coordinate of where a touch has been detected by the touch screen. Step 504 may be performed by the input device driver 208.

Next, one or more fake sensor entries are introduced into the sensor input stream at step 506. For example one or more fake touch events may be introduced into the touch event stream. Step 506 may be performed by the noise introduction module 210. Step 506 may be performed on a kernel level of the electronic device.

The fake sensor entries may be generated in accordance with a pattern to facilitate distinguishing the actual sensor entries from the fake sensor entries at a later time. For example, the fake sensor entries may be generated with a random number generator. In an example where the fake sensor entries are fake touch events, the random number generator may introduce randomized x-coordinate and y-coordinate values within a valid coordinate space of the touch screen.

As a specific example, a touch screen may record touch events at the locations (x1,y1); (x2,y2); and (x3,y3) resulting in a touch event sequence of three entries. Next, fake sensor events may be introduced in the form of fake touch coordinates, such as the coordinates (x4,y4) and (x5,y5), italicized for emphasis. The fake touch coordinates may be inserted in any manner with the actual touch coordinates, such as interweaving (e.g., (x1,y1); (x4,y4); (x2,y2); (x5,y5); and (x3,y3)) or in batches (e.g., (x1,y1); (x2,y2); (x3,y3); (x4,y4); and (x5,y5)), resulting in a touch event sequence of more than the original three entries.

Once values of the fake sensor entries are generated in accordance with the pattern, the values may be verified by determining whether a sensor entry matches the pattern. In a specific example, the random number generator may be seeded with a known/determined seed value. Any sensor entry that matches the pattern generated by the random number generator with the known seed value may be discounted as a fake sensor entry. In another specific example, values of the fake sensor entries may follow a mathematical pattern including a verifiable numeric characteristic, such as values being divisible by the number "5" (e.g., touch event coordinates of (5,5), (5,10), (10, 10), etc.). The values in accordance with the pattern may include a raw sensor measurement (e.g., a touch coordinate, an audio amplitude, a camera pixel intensity and/or color) or a metadata tag (e.g., a timestamp or a sensor ID) associated with the raw sensor measurement.

In some embodiments, via an application running on a user application level of the electronic device, the electronic device distinguishes an actual sensor entry from fake sensor entries at step 508. Step 508 may be performed by a module on the electronic device similar to the filter module 304 of FIG. 3.

Upon distinguishing the actual sensor entry, the actual sensor entry is transmitted to an authentication system at step 510. Alternatively in embodiments where step 508 is not performed, the sensor input stream with the fake sensor entries is transmitted to the authentication system. In those embodiments, the authentication system may perform the distinguishing step 508 described above.

Figure 6:
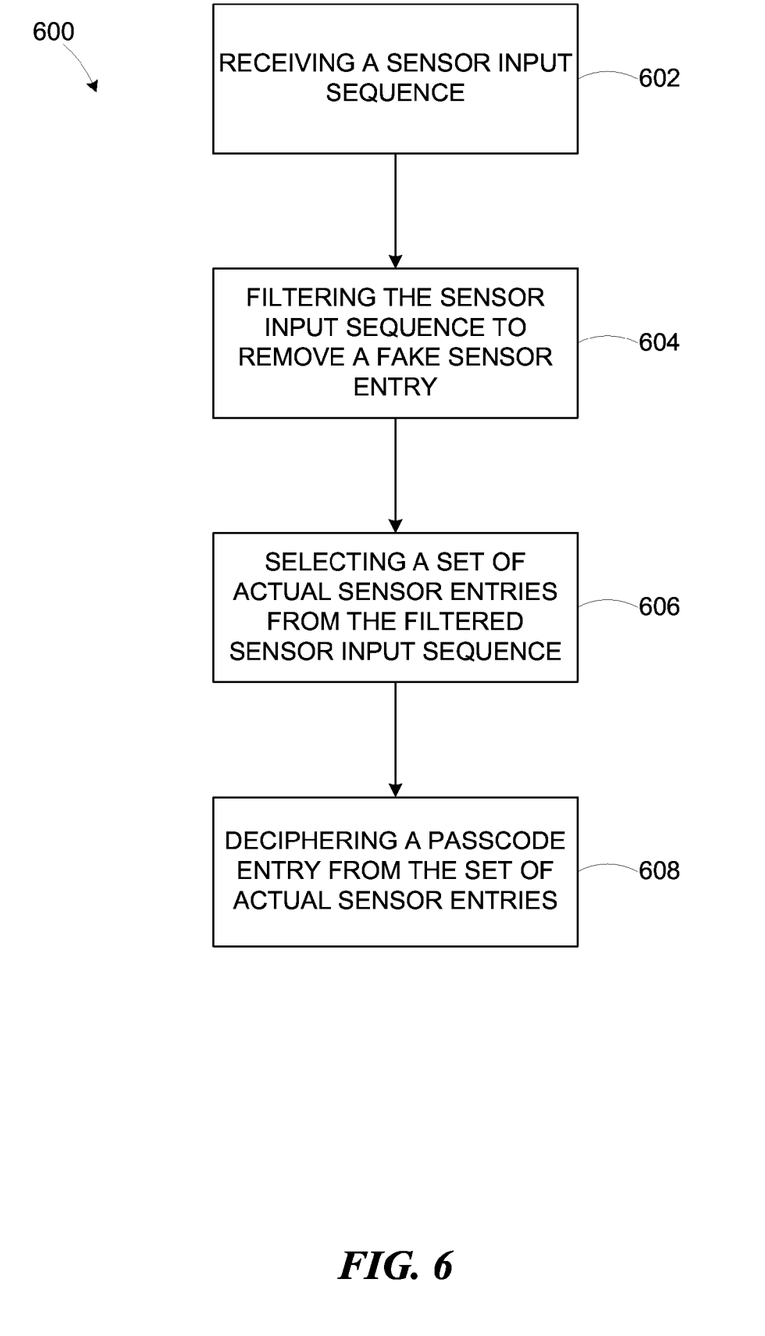
FIG. 6 is a flow chart of a process of operating a computing system to decipher a passcode entry by a user.

FIG. 6 is a flow chart of a process 600 of operating a computing system, such as the authentication system 300, to decipher a passcode entry by a user. The process 600 includes receiving a sensor input sequence from an electronic device, such as the electronic device 200, at step 602. In various embodiments, the sensor input sequence may include sensor entries during a period when a passcode interface is presented on the electronic device. Step 602 may be performed by the device communication module 302 of FIG. 3.

The computing system then filters the sensor input sequence to remove a fake sensor entry out of the sensor input sequence at step 604. For example, the filtering may be performed by subtracting a known sequence of fake sensor entries away from the sensor input sequence. The known sequence, for example, may be based on a known the value to a known random number generator, where the known random number generator was used to generate the fake sensor entries at the electronic device. Step 604 may be performed by the filter module 304 of FIG. 3.

Once filtered, the computing system selects a set of actual sensor entries from the filtered sensor input sequence at step 606. For example, the set of actual sensor entries may be the whole of the filtered sensor input sequence. Alternatively, where the electronic device has sent over a sensor input sequence including sensor entries unrelated to the passcode entry of a user, the computing system may select only the set of actual sensor entries that is indicative of the passcode entry by the user.

From the selected set, the computing system deciphers a passcode entry by the user. For example, the computing system may decipher the passcode entry by the user by mapping the set of actual sensor entries to a known passcode interface configuration. The set of actual sensor entries may indicate how the user has interacted with the passcode interface as observed by one or more sensor devices. The known passcode interface configuration provides the correspondence between the sensor input values and the associated characters use to compose the passcode entry. Step 606 and step 608 may be performed by the decipher module 306 of FIG. 3.

Regarding the process 500 and the process 600, while the various steps, blocks or sub-processes are presented in a given order, alternative embodiments may perform routines having steps, or employ systems having steps, blocks or sub-processes, in a different order, and some steps, sub-processes or blocks may be deleted, moved, added, subdivided, combined, and/or modified to provide alternative or subcombinations. Each of these steps, blocks or sub-processes may be implemented in a variety of different ways. Also, while steps, sub-processes or blocks are at times shown as being performed in series, some steps, sub-processes or blocks may instead be performed in parallel, or may be performed at different times as will be recognized by a person of ordinary skill in the art. Further any specific numbers noted herein are only examples: alternative implementations may employ differing values or ranges.

Figure 7:
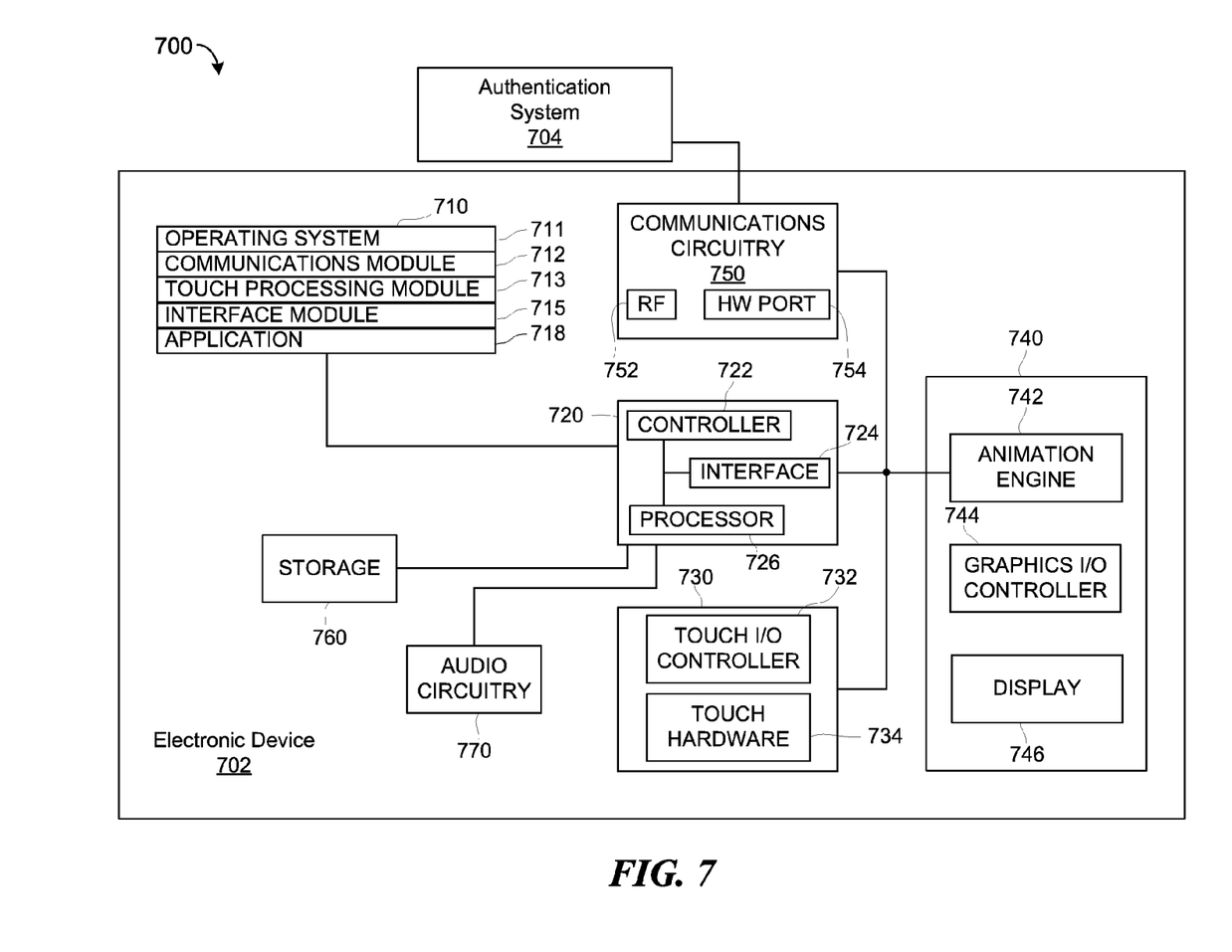
FIG. 7 is a block diagram of a passcode entry system including an electronic device and an authentication system.

FIG. 7 is a block diagram of a passcode entry system 700 including an electronic device 702 (e.g., the electronic device 200 of FIG. 2) and an authentication system 704 (e.g., the authentication system 300 of FIG. 3). Note that the architecture shown in FIG. 7 is only one example of an architecture for a passcode entry system in accordance with the technique introduced here; further, the electronic device 702 in FIG. 7 could have more or fewer components than shown, or a different configuration of components. The various components shown in FIG. 7 can be implemented by using hardware, software, firmware or a combination thereof, including one or more signal processing and/or application specific integrated circuits.

The electronic device 702 that can include one or more computer-readable mediums 710, processing system 720, touch subsystem 730, display/graphics subsystem 740, communications circuitry 750, storage 760, and audio circuitry 770. These components may be coupled by one or more communication buses or other signal lines. The electronic device 702 can be the same as or similar to the electronic device 102, the electronic device 200, or the electronic device 400.

The communications circuitry 750 can include RF circuitry 752 and/or port 754 for sending and receiving information. The RF circuitry 752 permits transmission of information over a wireless link or network to one or more other devices and includes well-known circuitry for performing this function. The port 754 permits transmission of information over a wired link. The communications circuitry 750 can communicate, for example, with the authentication system 704. The communications circuitry 750 can be coupled to the processing system 720 via a peripherals interface 724. The peripherals interface 724 can include various known components for establishing and maintaining communication between peripherals and the processing system 720.

The audio circuitry 770 can be coupled to an audio speaker (not shown), a microphone (not shown), an electronic card reader (not shown), or any combination thereof and includes known circuitry for processing voice signals received from the peripherals interface 724 to enable a user to communicate in real-time with other users. In some embodiments, the audio circuitry 770 includes a headphone jack (not shown).

The peripherals interface 724 can couple various peripherals, such as an electronic card reader, of the system to one or more processors 726 and the computer-readable medium 710. The one or more processors 726 can communicate with one or more computer-readable mediums 710 via a controller 722. The computer-readable medium 710 can be any device or medium that can store code and/or data for use by the one or more processors 726. The medium 710 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 710 may also include a transmission medium for carrying information-bearing signals indicative of computer instructions or data (with or without a carrier wave upon which the signals are modulated). For example, the transmission medium may include a communications network, including but not limited to the Internet, intranet(s), Local Area Networks (LANs), Wide Local Area Networks (WLANs), Storage Area Networks (SANs), Metropolitan Area Networks (MAN) and the like.

The one or more processors 726 can run various software components stored in the medium 710 to perform various functions for the electronic device 702. Note that the order of the modules in the medium 710 does not necessarily denote the order of layers of a software stack as implemented in the medium 710. In some embodiments, the software components include an operating system 711, a communication module (or set of instructions) 712, a touch processing module (or set of instructions) 712, an interface module (or set of instructions) 715, such as the passcode interface module 202 of FIG. 2, and one or more applications (or set of instructions) 718. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. In some embodiments, the medium 710 may store a subset of the modules and data structures identified above. Furthermore, the medium 710 may store additional modules and data structures not described above.

The operating system 711 can include various procedures, sets of instructions, software components and/or drivers for controlling and managing general system tasks (e.g., memory management, storage device control, power management, etc.) and facilitates communication between various hardware and software components.

The communication module 712 facilitates communication with other devices using the communications circuitry 750 and includes various software components for handling data received from the RF circuitry 752 and/or the port 754.

The touch processing module 713 includes various software components for performing various tasks associated with touch hardware 734 including but not limited to receiving and processing touch input received from the I/O device 730 via a touch I/O device controller 732. For example, the touch processing module 713 can also include software components for performing tasks associated with other I/O devices (not shown).

The interface module 715 is configured to present and maintain a passcode interface for a user to enter a passcode to authenticate the user's identity. The interface module 715 can include various known software components for rendering, animating and displaying graphical objects on a display surface. In embodiments, in which the touch hardware 734 is a touch sensitive display (e.g., touch screen), the interface module 715 includes components for rendering, displaying, and animating objects on the touch sensitive display. The interface module 715 can provide animation instructions to an animation engine 742, which can render the graphics and provide the rendering to graphics I/O controller 744, so that the graphics I/O controller 744 can display the graphics on display 746. The interface module 715 can further control the audio circuitry 770 to provide an auditory component to the passcode interface.

One or more applications 718 can include any applications installed on the electronic device 702, including without limitation, modules of the electronic device 200, a browser, keyboard emulation, widgets, JAVA-enabled applications, encryption, digital rights management, voice recognition, voice replication, location determination capability (such as that provided by the global positioning system (GPS)), etc.

The touch I/O controller 732 is coupled to the touch hardware 734 for controlling or performing various functions. The touch hardware 732 communicates with the processing system 720 via the touch I/O device controller 732, which includes various components for processing user touch input (e.g., scanning hardware). One or more other input controllers (not shown) receives/sends electrical signals from/to other I/O devices (not shown). Other I/O devices may include physical buttons, dials, slider switches, sticks, keyboards, touch pads, additional display screens, or any combination thereof.

If embodied as a touch screen, the touch hardware 734 displays visual output to the user in a GUI. The visual output may include text, graphics, video, and any combination thereof. Some or all of the visual output may correspond to user-interface objects. The touch hardware 734 forms a touch-sensitive surface that accepts touch input from the user. The touch hardware 734 and the touch controller 732 (along with any associated modules and/or sets of instructions in the medium 710) detects and tracks touches or near touches (and any movement or release of the touch) on the touch hardware 734 and converts the detected touch input into interaction with graphical objects, such as one or more user-interface objects. In the case in which the touch hardware 734 and the display 725 are embodied as a touch screen, the user can directly interact with graphical objects that are displayed on the touch screen. Alternatively, in the case in which hardware 734 is embodied as a touch device other than a touch screen (e.g., a touch pad), the user may indirectly interact with graphical objects that are displayed on a separate display screen.

Embodiments in which the touch hardware 734 is a touch screen, the touch screen may use LCD (liquid crystal display) technology, LPD (light emitting polymer display) technology, OLED (organic light emitting diode), or OEL (organic electro luminescence), although other display technologies may be used in other embodiments.

Feedback may be provided by the touch hardware 734 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

In some embodiments, the peripherals interface 724, the one or more processors 726, and the memory controller 722 may be implemented on a single chip. In some other embodiments, they may be implemented on separate chips. The storage 760 can any suitable medium for storing data, including, for example, volatile memory (e.g., cache, RAM), non-volatile memory (e.g., Flash, hard-disk drive), or a both for storing data, including pages used for transition animations.

Regarding FIGS. 2-4 and 7, blocks, components, and/or modules associated with the electronic device 200, the authentication system 300, or the electronic device 702 each may be implemented in the form of special-purpose circuitry, or in the form of one or more programmable processors that are programmed to provide the functionality described above, or in a combination of such forms. For example, the modules described can be implemented as instructions on a tangible storage memory capable of being executed by a processor or a controller on a machine. The tangible storage memory may be a volatile or a non-volatile memory. In some embodiments, the volatile memory may be considered "non-transitory" in the sense that it is not a transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof.

Each of the modules may operate individually and independently of other modules. Some or all of the modules may be executed on the same host device or on separate devices. The separate devices can be coupled via a communication module to coordinate its operations via an interconnect or wirelessly. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The electronic device 200, the authentication system 300, or the electronic device 702 may include additional, fewer, or different modules for various applications.

Each section or figure of this disclosure may exemplify different implementations and relationships between elements and terms. However, similar elements and terms referred in the different sections of this disclosure and the drawings are meant to be compatible with each other in various embodiments.

Alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Those of skill in the art will appreciate that the invention may be embodied in other forms and manners not shown below. It is understood that the use of relational terms, if any, such as first or second, and the like are used solely for distinguishing one entity or action from another, without necessarily requiring or implying any such actual relationship or order between such entities or actions.

As used herein, the terms "connected," "coupled," or any variant thereof when applying to modules of a system, means any connection or coupling, either direct or indirect, between two or more elements; the coupling of connection between the elements can be physical, logical, or any combination thereof. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list. The word "portion" or "portioned" in reference to a sequence includes any subset or the whole of the sequence.

Reference in this specification to "various embodiments" or "some embodiments" means that a particular feature, structure, or characteristic described in connection with the embodiment is included in at least one embodiment of the disclosure. An embodiment and an alternative embodiment (e.g., referenced as "other embodiments") made in reference thereto may not be mutually exclusive of each other. Moreover, various features are described which may be exhibited by some embodiments and not by others. Similarly, various requirements are described which may be requirements for some embodiments but not other embodiments.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

What is claimed is:

1. A method to prevent unauthorized logging of a passcode entered into a mobile device, the method comprising:
   initiating a financial transaction when a card reader, coupled to the mobile device, detects swiping of a financial transaction card from a user;
   in response to initiating of the financial transaction, displaying a key pad on the mobile device to authenticate the user via a passcode entry on the key pad;
   receiving a touch event sequence of actual touch events on a touch screen of the mobile device, wherein each actual touch event includes a coordinate of where a touch has been detected by the touch screen of the mobile device when the key pad is displayed on the touch screen;
   introducing a plurality of fake touch events to the touch event sequence on the mobile device, wherein each fake touch event includes a fake coordinate corresponding to the touch screen;
   filtering the touch event sequence to remove the fake touch events based on a timing pattern, wherein the timing pattern is synchronized with a clock signal, wherein time records of the fake touch events and/or the actual touch events are adjusted to match the timing pattern; and
   transmitting the touch event sequence to determine the passcode entry by the user.

2. The method of claim 1, further comprising generating the fake touch events by using a random number generator.

3. The method of claim 1, wherein introducing the fake touch events comprises introducing the fake touch events at a kernel level of an operating system of the mobile device, and wherein distinguishing the actual touch events is at an application-level of the operating system.

4. The method of claim 1, wherein filtering the touch event sequence enables distinguishing the actual touch events by subtracting the fake touch events from the touch event sequence based on the timing pattern, wherein the timing pattern is a pattern of time differences between each fake touch event and/or a pattern of time differences between each actual touch event.

5. The method of claim 1, wherein the timing pattern is a pattern of time differences before each fake touch event and/or before each actual touch event.

6. A method to prevent unauthorized logging of a passcode entered into an electronic device, the method comprising:
   initiating a financial transaction on the electronic device;
   in response to initiating of the financial transaction, presenting a passcode entry interface on the electronic device;
   receiving a sensor input sequence from a sensor of the electronic device, wherein the sensor input sequence is indicative of a user's interaction with the passcode entry interface; and
   introducing a fake sensor entry into the sensor input sequence on the electronic device, wherein the fake sensor entry is introduced in accordance with a timing pattern for subsequently distinguishing the fake sensor entry from an actual sensor entry in the sensor input sequence, wherein the timing pattern is synchronized with a clock signal.

7. The method of claim 6, further comprising identifying the actual sensor entry from the sensor input sequence, wherein the actual sensor entry is recorded during a period of presenting the passcode entry interface on the electronic device.

8. The method of claim 7, wherein identifying the actual sensor entry includes identifying the actual sensor entry by filtering fake sensor entries from the sensor input sequence based on the timing pattern.

9. The method of claim 7, further comprising transmitting the identified actual sensor entry to a remote processing system to determine a passcode entry by the user.

10. The method of claim 6, wherein introducing the fake sensor entry includes introducing the fake sensor entry with a time record that distinguishes the fake sensor entry from a time record of the actual sensor entry in the sensor input sequence.

11. The method of claim 6, wherein introducing the fake sensor entry includes introducing the fake sensor entry with a fake sensor measurement, and wherein the fake sensor measurement has a verifiable numeric characteristic.

12. The method of claim 6, wherein introducing the fake sensor entry includes introducing the fake sensor entry with a fake sensor measurement, and wherein the fake sensor measurement is part of a constant sequence of numerical values.

13. The method of claim 6, wherein the fake sensor entry is introduced at a kernel level or an application level of an operating system on the electronic device or a firmware level of the sensor.

14. The method of claim 6, wherein introducing the fake sensor entry into the sensor input sequence includes introducing at least one of the fake sensor entry for every actual sensor entry in the sensor input sequence.

15. The method of claim 6, wherein introducing the fake sensor entry into the sensor input sequence includes introducing at least one of the fake sensor entry with a timestamp within when the passcode entry interface is presented on the electronic device.

16. The method of claim 6, further comprising transmitting the sensor input sequence including the fake sensor entry to a remote processing system to determine a passcode entry by the user.

17. The method of claim 6, further comprising:
filtering the sensor input sequence to remove the fake sensor entry based on the timing pattern, wherein a time record of the fake sensor entry and/or the actual sensor entry is adjusted to match the timing pattern; and
transmitting the sensor input sequence with the fake sensor entry removed to determine the passcode entry by the user.

18. A method of operating a computing system to decipher a passcode entry based at least in part on a sensor input sequence from a remote electronic device, the method comprising:
receiving the sensor input sequence from the electronic device, the sensor input sequence including a fake sensor entry and actual sensor entries, wherein at least some of the actual sensor entries correspond to passcode entries;
filtering the sensor input sequence to remove the fake sensor entry included in the sensor input sequence based on a timing pattern, wherein the timing pattern is synchronized with a clock signal;
determining, from the filtered sensor input sequence, a set of the actual sensor entries corresponding to the passcode entries, wherein the set of the actual sensor entries corresponding to the passcode entries is recorded when a passcode entry interface is presented on the electronic device and the set of the actual sensor entries corresponding to the passcode entries is indicative of the passcode entry by a user; and
deciphering the passcode entry by the user based at least in part on the set of actual sensor entries corresponding to the passcode entries.

19. The method of claim 18, wherein filtering the fake sensor entry comprises identifying the fake sensor entry based on the timing pattern wherein a time records for the fake sensor entry and/or for the actual sensor entries are adjusted to match the timing pattern.

20. The method of claim 19, wherein the timing pattern is a pattern of time differences between each fake sensor entry and/or a pattern of time differences between each actual sensor entry.

21. The method of claim 19, wherein the pattern is a pattern of time differences before each fake sensor entry and/or before each actual sensor entry.

22. The method of claim 18, wherein timing pattern is applied using time information included in metadata associated with each fake sensor entry and/or each actual sensor entry.

23. A non-transitory computer storage medium on which is encoded a computer program product, which when executed by a processor, causes the processor to:
initiate a financial transaction on an electronic device;
in response to initiating of the financial transaction, present a passcode entry interface on the electronic device;
receive a sensor input sequence from a sensor of the electronic device, wherein the sensor input sequence is indicative of a user's interaction with the passcode entry interface; and
introduce a plurality of fake sensor entries into the sensor input sequence on the electronic device, wherein the fake sensor entries are introduced in accordance with a timing pattern for subsequently distinguishing the fake sensor entries from actual sensor entries in the sensor input sequence, wherein the timing pattern is synchronized with a clock signal, wherein time records of the fake touch events and/or the actual touch events are adjusted to match the timing pattern.

24. The non-transitory computer storage medium of claim 23, wherein the sensor input sequence is a sequence of touch events from a touch screen of the electronic device.

25. A processing device comprising:
a memory;
a display device to present to a user a passcode entry interface on the processing device;
a sensor to store a sensor input sequence on the memory, wherein the sensor input sequence is indicative of a user's interaction with the passcode entry interface; and
a processor configured to introduce a fake sensor entry into the sensor input sequence, wherein the fake sensor entry is introduced in accordance with a determined timing pattern for subsequently distinguishing the fake sensor entry from an actual sensor entry in the sensor input sequence, wherein the timing pattern is synchronized with a clock signal, wherein a time record of the fake sensor entry and/or the actual sensor entry is adjusted to match the timing pattern.

26. The processing device of claim 25, wherein the processor is configured to implement an operating system; and wherein the fake sensor entry is introduced into the sensor input sequence at a kernel level of the operating system.

* * * * *